United States Patent [19]

Frick

[11] Patent Number: 4,758,025
[45] Date of Patent: Jul. 19, 1988

[54] USE OF ELECTROLESS METAL COATING TO PREVENT GALLING OF THREADED TUBULAR JOINTS

[75] Inventor: John P. Frick, Dallas, Tex.

[73] Assignee: Mobil Oil Corporation, New York, N.Y.

[21] Appl. No.: 918,615

[22] Filed: Oct. 10, 1986

Related U.S. Application Data

[63] Continuation of Ser. No. 746,164, Jun. 18, 1985, abandoned.

[51] Int. Cl.[4] ............................................. F16L 9/14
[52] U.S. Cl. .................................. 285/55; 285/94; 285/333; 285/422; 427/305
[58] Field of Search ............... 285/45, 94, 55, 333, 285/334, 355, 340, 422; 427/304, 305, 436, 437, 406; 411/900, 901; 403/299, 343; 29/458; 148/6.14, 6.152

[56] References Cited

U.S. PATENT DOCUMENTS

| | | | |
|---|---|---|---|
| 1,141,151 | 6/1915 | Speller | 285/333 X |
| 2,145,168 | 1/1939 | Flagg | 285/355 X |
| 2,240,021 | 4/1941 | Rutherford | 285/422 X |
| 2,407,552 | 9/1946 | Hoesel | 285/355 |
| 2,472,393 | 6/1949 | Avallone et al. | 427/437 |
| 3,116,178 | 12/1963 | Upham et al. | 148/6.152 |
| 3,147,154 | 9/1964 | Cole et al. | 427/437 X |
| 3,355,192 | 11/1967 | Kloesel et al. | 285/94 |
| 3,468,563 | 9/1969 | Duret | 285/94 X |
| 3,659,882 | 5/1972 | Souresny | 285/333 |
| 3,784,238 | 1/1974 | Chance et al. | 285/333 X |
| 3,793,037 | 2/1974 | Holias | 427/437 X |
| 4,002,778 | 1/1977 | Bellis et al. | 427/304 X |
| 4,002,786 | 1/1977 | Hirohata | 427/437 |
| 4,379,575 | 4/1983 | Martin | 285/381 X |
| 4,527,815 | 7/1985 | Frick | 285/55 |
| 4,563,217 | 1/1986 | Kikuchi et al. | 427/437 X |

Primary Examiner—Dave W. Arola
Attorney, Agent, or Firm—Alexander J. McKillop; Michael G. Gilman; Charles A. Malone

[57] ABSTRACT

The present invention discloses the use of electroless metal coatings, preferably copper or zinc, on oil country tubular goods to eliminate galling of the threads, provide a tortuous path as a sealing surface, and provide porous lubricant reservoirs.

20 Claims, 1 Drawing Sheet

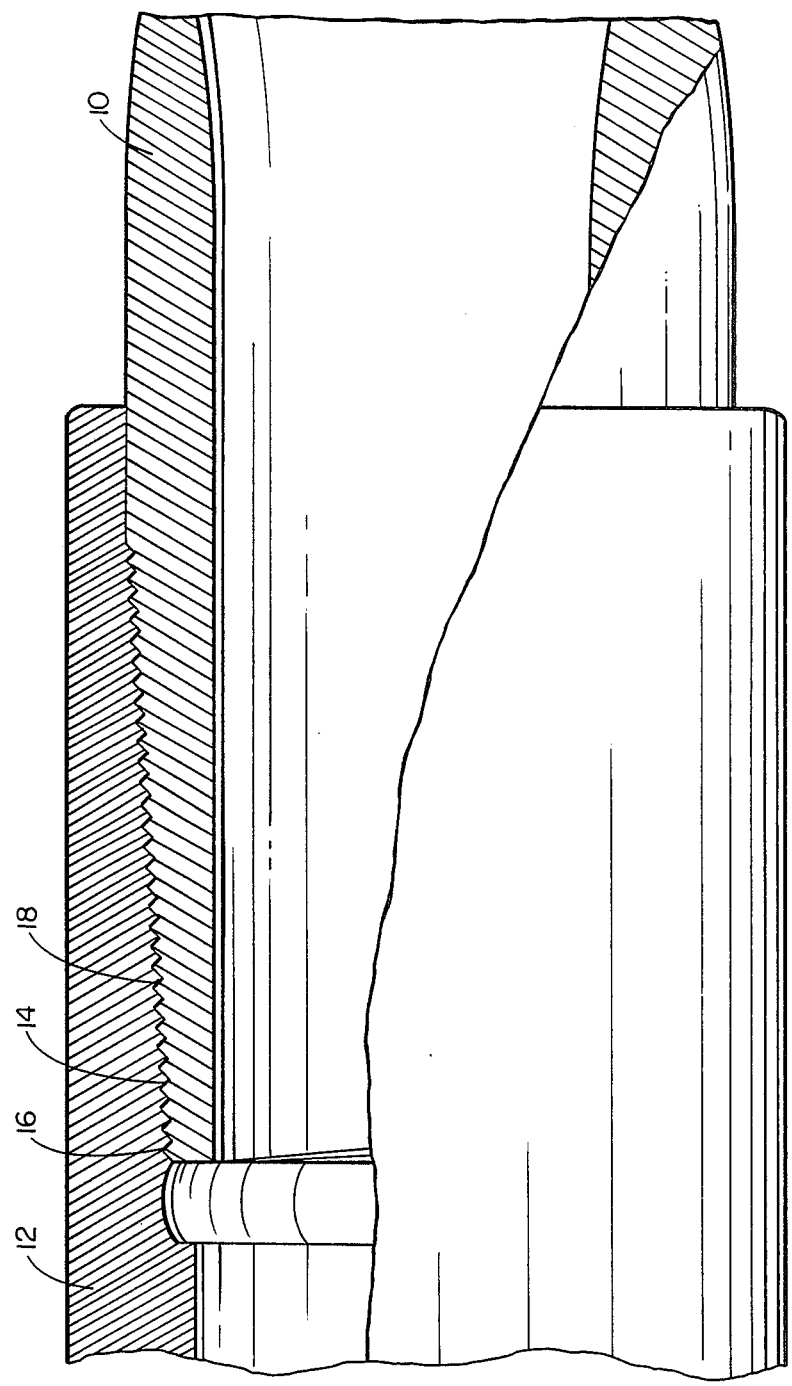

USE OF ELECTROLESS METAL COATING TO PREVENT GALLING OF THREADED TUBULAR JOINTS

This is a continuation of copending application Ser. No. 746,164, filed on June 18, 1985 and now abandoned.

This application is related to co-pending U.S. application filed on Oct. 21, 1982 bearing Ser. No. 435,784 and now U.S. Pat. No. 4,527,815, July 9, 1985.

FIELD OF THE INVENTION

This invention relates to oil country tubular threaded joints provided with an electroless metal coating that eliminates galling of the threads, provides a tortuous path as a sealing surface, and provides porous lubricant reservoirs.

BACKGROUND OF THE INVENTION

Galling of casing and tubing threads has been a problem in the oil field for many years. It is particularly pronounced in the softer grades of quenched and tempered pipe. Galling is caused by two metal surfaces coming into "intimate" or "metallurgical" contact. When this happens metal is pressed against metal (without benefit of lubricant, oxide coating, or other protective film) with sufficient force that small areas atomically bond together. This can be viewed as spot welding on an atomic scale. When the metal surfaces are moved the metal is torn apart. Sometimes the rough metal in the torn areas will also damage the metal surfaces.

In order to prevent galling it is necessary to prevent the "intimate" contact of the surfaces.

Research has indicated that soft metals are more prone to galling than hard metals and that similar metal couples are more prone to galling than dissimilar metal couples.

Typical methods in use in the oil and gas industry involve the use of a lubricant which forms a layer between the surfaces. The lubricant is oil or grease. Sometimes particles of soft metals such as copper, lead, zinc, or tin are added. These particles serve two functions. Firstly, they act as a barrier preventing intimate contact of the surfaces. Secondly, under extreme pressure they deform and act as a lubricant between the surfaces.

Other approaches in the prior art have used conversion coatings on the metal surfaces in conjunction with lubricants. These conversion coatings are commonly referred to as "phosphate" or "black oxide" coatings or by their proprietary process name, e.g. "Parkerizing". They are characterized by the formation of a chemical compound (usually a phosphate or oxide) on the surface to be protected. During this process a portion of the original metal surface is dissolved. The conversion coatings prevent galling by (1) the interposition of a barrier layer (the oxide or phosphate) between the metal surfaces; (2) creating pockets of lubricant in the coating layer (due to the porous nature of the coating) which provide a more or less constant supply of lubricant to the surfaces under extreme pressure conditions; and (3) the creation of an irregular surface on the metal through the dissolution process.

Another method of preventing galling consists of "surface improvement treatments" of the surfaces to be protected. These treatments may be sandblasting or blasting with glass beads or shot. Liquid and vapor honing are also examples of treatments of this class. These treatments roughen the surface making many small dimples. These dimples serve as a lubricant reservoirs under extreme pressure conditions. A lubricant must of course be provided to fill such reservoirs.

Still a further method of preventing galling consists of applying a coating of soft metal such as tin or zinc to one of the surfaces to be protected. This technique is commonly also used with a lubricant. The metal coating acts as a lubricant of last resort under extreme pressure conditions. This method is described in U.S. Pat. No. 1,141,151 to F. N. Speller.

Sealing of casing and tubing connections is a problem in the oil and gas industry. It is difficult to run a string of pipe in a well and have a leak tight system. This is because the reliability of existing connections for leak resistance is not very high and because of the large number of connections which must be made in the string.

One solution for sealing is that used for API 8-round threads. A viscous material (such as API thread dope) is smeared on the threads before the connection is made up. The thread dope acts as a sealant for the joint. This system is not satisfactory at high pressures.

Another solution for sealing is that sometimes used for API buttress threads. The threads are coated with a soft metal such as zinc or tin and this metal coating serves to plug the gaps in the threads which could cause a leak.

A further solution for sealing is to use one or more metal to metal seals in conjunction with a threaded connection. Examples of this approach include Hydril Super EU, CS, and PH 6 connections, Atlas Bradford TC-4S and CQS connections, Mannesmann BDS and TDS connections and the VAM connection. These seals work because they form a tortuous path (on an atomistic scale) through which the gas molecules have difficulty in passing.

Still a further solution for sealing is the use of a ring or gasket of elastomeric or thermoplastic material in the body of the threads. An example of this would be the Teflon ® ring in the Atlas Bradford TC-4S connection.

The present invention provides a method for preventing galling, provides an effective fluid seal, and provides porous lubricant reservoirs by covering one surface with a soft metal coating such as electroless copper or zinc.

SUMMARY OF THE INVENTION

The present invention relates to a method for preventing galling, providing a more effective fluid seal, and providing porous lubricant reservoirs of a threaded oil country tubular connection between the end of a first pipe section and the end of a second pipe section. A soft coating of an electroless metal, preferrably copper or zinc, is applied to the internal threads of the socket of the first pipe or the threads of the end of the second pipe.

BRIEF DESCRIPTION OF THE DRAWING

The attached drawing is a side view partly in central longitudinal section illustrating the threaded connection between the end of a first pipe section and a second pipe section provided with a coating of an electroless metal on the threads of the second pipe section.

DESCRIPTION OF THE PREFERRED EMBODIMENTS

This invention consists of the use of electroless metal coatings, preferably copper or zinc, on oil country tubular goods to eliminate galling of the threads, provide a tortuous path as a sealing surface, and provide porous lubricant reservoirs.

Referring to the accompanying drawing, there is shown a threaded joint between tubular pipe ends 10 and 12. Pipe end 10 is tapered and threaded at 14 for engagement with the threaded end 16 of pipe 12. The tubular pipe ends 10 and 12 consist of metal such as stainless steel or carbon steel. The threads 14 of pipe end 10 are provided with a soft coating 18 of an electroless metal, preferrably copper or zinc. The common method of applying electroless metal coatings causes this coating to be naturally porous. The electroless metallic coating, preferrably copper or zinc, is applied by immersing the part to be coated in a hot bath containing an organic copper or zinc compound. The organic compound decomposes and deposits the selected metal, preferrably copper or zinc, on the surface to be coated. Such a bath is not dissimilar to those used to apply conversion coatings. Since conversion coatings are currently in wide use in the oil and gas industry this coating could be easily adapted to commercial production. This type of process deposits the coating in a very uniform manner (as opposed to electrolytic processes which tend to apply thicker coatings to the crests of the threads). This uniformity of coatings will result in lower stresses in the connection after makeup, thus improving the performance of the connection.

The selected electroless metallic coating 18, either copper or zinc, is softer than the facing metal of threads 16 which prevents galling and protects the surfaces from intimate contact by the interposition of the soft coating. By careful practice in the application of the coating, controlled porosity can be introduced into the coating. This porosity will act as lubricant reservoirs supplying lubricant under extreme pressure conditions.

The soft coating, when pressed against the harder metal will form a tortuous path and thereby provide an effective fluid seal.

Alternately, it is to be recognized that the electroless metallic coating, either copper or zinc, may be applied to the internal threads 16 of pipe end 12 rather than threads 14 in the manner as hereinabove described.

From the foregoing specification one skilled in the art can readily ascertain the essential features of this invention and without departing from the spirit and scope thereof can adapt it to various diverse applications. It is my intention and desire that my invention be limited only by those restrictions or limitations as are contained in the claims appended immediately hereinafter below.

What is claimed is:
1. A method for preventing galling, providing a more effective fluid seal, and providing porous lubricant reservoirs of a threaded connection between the end of a first pipe section and the end of a second pipe section, said connection consisting of a threaded metal socket on the end of said first pipe section and a threaded metal end on the end of said second pipe section engaged in said socket, comprising:
    (a) depositing an electroless metal conversion coating on the threaded end of said first pipe section which forms a uniformly deposited porous coating softer than the metal comprising the threaded uncoated end of said second pipe section; and
    (b) connecting said threaded coated end of said first pipe section with the threaded uncoated end of said second pipe section which soft coating on said first section presses against the harder metal of said second section and forms an effective fluid seal.

2. The method of claim 1 wherein said first and second pipe sections consist of stainless steel and said soft metal coating consists of electroless copper.

3. The method of claim 1 wherein said first and second pipe sections consist of carbon steel and said soft metal coating consists of eletroless copper.

4. The method of claim 1 wherein said first and second pipe sections consist of carbon steel and said soft metal coating consists of electroless zinc.

5. The method of claim 1 wherein said first and second pipe sections consist of stainless steel and said soft metal coating consists of electroless zinc.

6. A threaded connection between the end of a first pipe section and the end of a second pipe section, comprising a threaded metal socket on said first pipe section, a threaded metal end on said second pipe section to engage in said socket, and a conversion coating forming a uniform metal coating on said threads of one of said pipe sections softer than the metal of the other uncoated pipe section which said metal when threaded and pressed against said harder metal will provide an effective seal.

7. A threaded connection according to claim 6 wherein the first and second pipe sections consist of stainless steel and said soft metal coating consists of electroless copper.

8. A threaded connection according to claim 6 wherein the first and second pipe sections consist of carbon steel and said soft metal coating consists of electroless copper.

9. A threaded connection according to claim 6 wherein the first and second pipe sections consist of stainless steel and said soft metal coating consists of electroless zinc.

10. A threaded connection according to claim 6 wherein the first and second pipe sections consist of carbon steel and said soft metal coating consists of electroless zinc.

11. A method for preventing galling, providing a more effective fluid seal, and providing porous lubricant reservoirs of a threaded connection between the end of a first pipe section and the end of a second pipe section, said connection consisting of a threaded metal socket on the end of said first pipe section and a threaded metal end on the end of said second pipe section engaged in said socket, comprising:
    (a) depositing an electroless metal conversion coating on the threaded end of said second pipe section which forms a uniformly deposited porous coating softer than the metal comprising the threaded uncoated end of said first pipe section; and
    (b) connecting said threaded coated end of said second pipe section with the threaded uncoated end of said first pipe section which soft coating on said second section presses against said harder metal of said first section and forms an effective fluid seal.

12. The method as recited in claim 11 wherein said first and second pipe sections consist of stainless steel and said soft metal coating consists of electroless copper.

13. The method as recited in claim 11 wherein said first and second pipe section connections consist of carbon steel and said soft metal coating consists of eletroless copper.

14. The method as recited in claim 11 wherein said first and second pipe sections consist of carbon steel and said soft metal coating consists of eletroless zinc.

15. The method as recited in claim 11 wherein said first and second pipe sections consist of stainless steel and said soft metal coating consists of electroless zinc.

16. A method for making a threaded connection between the threaded end of a first pipe section and the threaded end of a second pipe section comprising:
   (a) depositing a porous metal conversion coating uniformly deposited on threads contained on the end of one of said pipe sections thereby forming a metal coating softer than the metal of the uncoated threaded pipe section; and
   (b) threading together the threaded end of both pipe sections thereby causing the softer metal coating to press against the harder uncoated threaded pipe section which provides an effective seal.

17. The method of claim 16 wherein the first and second pipe sections consist of stainless steel and said soft metal coating consists of eletroless copper.

18. The method of claim 16 wherein the first and second pipe sections consist of carbon steel and said soft metal coating consists of electroless copper.

19. The method of claim 16 wherein the first and second pipe sections consist of stainless steel and said soft metal coating consists of electroless zinc.

20. The method of claim 16 wherein the first and second pipe sections consist of carbon steel and said soft metal coating consists of electroless zinc.

* * * * *